United States Patent [19]

Ford et al.

[11] Patent Number: 4,582,714

[45] Date of Patent: Apr. 15, 1986

[54] AIR OR OIL EMULSION FOOD PRODUCT HAVING GLUCOMANNAS AS SOLE STABILIZER-THICKENER

[75] Inventors: David M. Ford, Halifax; Peter A. Cheney, Anstey, both of England

[73] Assignee: Mars G.B. Limited, London, England

[21] Appl. No.: 640,521

[22] Filed: Aug. 14, 1984

Related U.S. Application Data

[63] Continuation-in-part of Ser. No. 396,392, Jul. 8, 1982, abandoned.

[51] Int. Cl.⁴ .................. A23C 19/09; A23C 13/12; A23G 9/02; A23L 1/32
[52] U.S. Cl. .................................. 426/564; 426/565; 426/568; 426/570; 426/569; 426/580; 426/582; 426/602; 426/605
[58] Field of Search ............... 426/573, 575, 569, 654, 426/565, 568, 570, 583, 564, 602, 580, 605, 582

[56] References Cited

U.S. PATENT DOCUMENTS

| | | | |
|---|---|---|---|
| 3,928,322 | 12/1975 | Sugiyama et al. | 260/236.5 |
| 3,973,008 | 8/1976 | Sugiyama et al. | 424/195 |
| 4,269,863 | 5/1981 | Inagami et al. | 426/550 |

FOREIGN PATENT DOCUMENTS

| | | |
|---|---|---|
| 2148159 | 8/1972 | Fed. Rep. of Germany . |
| 42179 | 12/1971 | Japan ................................... 426/573 |
| 147989 | 7/1976 | Japan ................................... 426/573 |
| 5577870 | 5/1978 | Japan . |
| 367340 | 2/1932 | United Kingdom . |
| 947282 | 1/1964 | United Kingdom . |
| 2048642 | 12/1980 | United Kingdom . |
| 2050405 | 1/1981 | United Kingdom . |

OTHER PUBLICATIONS

Chem Absts. vol. 94 (11) 11-18-81.
Chem Absts. vol. 97 (9) 4-21-82.
Chem Absts. vol. 98 (10) 11-15-82.
Chem. Absts. vol. 96 (17) 12-17-81.
Chem. Abstr. 93, 6378w (1980).
"Preparation of Food from Soybean Milk and Glucomannan", Abstract of Japanese patent 55 77870, Patent Abstracts of Japan 4, 33 c 23 (1980).

*Primary Examiner*—Jeanette Hunter
*Attorney, Agent, or Firm*—Curtis, Morris & Safford

[57] ABSTRACT

An ungelled processed food product, especially an emulsion such as ice cream, whipping cream, cheese spread, cheese slices, a flavored milk drink, or a meringue, which has been stabilized and/or thickened by the incorporation therein of at least one glucomannan, preferably a glucomannan derived from Amorphophallus species.

8 Claims, No Drawings

AIR OR OIL EMULSION FOOD PRODUCT HAVING GLUCOMANNAS AS SOLE STABILIZER-THICKENER

This is a continuation-in-part of application Ser. No. 396,392, filed July 8, 1982 now abandoned.

This invention relates to food products and more especially to ungelled processed food products, particularly emulsions, containing a stabilizing or thickening agent.

Various processed food products such as ice cream, whipping cream, cheese spreads, cheese slices, milk drinks, meringues and the like when produced on a commercial scale normally incorporate a stabilizing and/or thickening agent to improve their processability, texture, organoleptic properties and storage capability.

Various materials have been used as stabilizing and thickening agents including carob gun and/or cellulose ethers such as the hydroxyethyl and carboxymethyl ethers.

Carob gum is now in short supply and is relatively expensive but for many applications is among the best stabilizing and thickening agents hitherto available.

This invention is based on the observation that glucomannans, especially those derived from Amorphophallus species and especially from *A. rivieri* and its varieties (often referred to as *A. konjac*), *A. oncophyllus*, *A. variabilis*, *A. bulbifera*, and *A. blumeii* can be used satisfactorily to replace carob gum or carob gum, alone or in admixture with other gums and thickeners, as a stabilizing and/or thickening agent in processed food products such as those indicated above.

Such glucomannans, especially those derived from *A. konjac*, are in many cases cheaper than carob gum and frequently can be used in smaller quantities than carob gum to achieve the same effect or a better effect.

This invention provides an ungelled processed food product having a pH less than 8 which has been stabilized and/or thickened by the incorporation therein of at least one glucomannan, preferably a glucomannan derived from an Amorphophallus species and especially a glucomannan derived from *A. konjac*, *A. oncophyllus*, *A. variabilis*, *A. blumeii*, or *A. bulbifera* in an amount within the range from 0.1 to 5% by weight based on the food product.

The food product may be any food product which is normally thickened and/or stabilized. Among such products are for example dairy products such as ice cream, whipping cream, cheese spread, cheese slices, or a flavored milk drink, a meringue, salad creams and mayonnaises, gravies and sauces, and the like. However, the thickening and/or stabilization of emulsions with the agents of the invention is particularly advantageous. In this case, the stabilizer or thickener imparts to a liquid with which it is combined a viscous mobile structure at room temperature, in which liquid air or oil droplets may be present as a discontinuous phase. This phenomenon must be distinguished from gelation, in which a liquid is converted to a rigid, solid structure by the addition of a gelling agent. The aforementioned food products are examples of emulsions which are thickened and/or stabilized to advantage according to the present invention.

The following examples illustrate the invention.

In the Examples two different forms of Konjac glucomannan were used: the material referred to as Japanese konjac is a purified glucomannan extract of approximately 90% by weight glucomannan content and is a commercially available product; the material referred to as Chinese taro is a crude material obtained by slicing, drying and grinding whole tubers of *A. Konjac* from a Chinese source to a particle size of 0.5 mm or less. The Chinese taro material contains large amounts of starch in addition to the glucomannan and in the examples is used in an amount which is 56% more than is used with Japanese konjac to ensure that the glucomannan content of the produced food products is the same. The word "Genulacta" is a Registered Trade Mark.

EXAMPLE 1

Ice Cream

Some commercial ice creams use carob gum for its stabilizing and thickening powers. It imparts smooth melt-down and heat-shock resistance and is not affected by lactic acid or calcium salts.

The ice cream was made to the recipe shown in Table 1.

TABLE 1

|  | % |
| --- | --- |
| Butter | 10 |
| Sugar | 14 |
| Skimmed milk powder | 11 |
| "Genulacta L100" | 0.015 |
| Carob gum | 0.16 |
| Glycerol monostearate (GMS) | 0.12 |
| Vanilla | 0.24 |
| Water | 64.465 |

"Genulacta L100" is a casein-reactive carrageenan from Hercules Ltd.

Four samples were prepared as shown in Table 2.

TABLE 2

| | Recipes for Test Samples (grams) | | | |
| --- | --- | --- | --- | --- |
| | Sample 1 (Control) | Sample 2 (Carob gum) | Sample 3 (Konjak) | Sample 4 (Taro) |
| Butter | 1020 | 1020 | 1020 | 1020 |
| Milk powder | 1100 | 1100 | 1100 | 1100 |
| Sugar | 1440 | 1440 | 1440 | 1440 |
| GMS | 12 | 12 | 12 | 12 |
| Vanilla | 24 mls | 24 mls | 24 mls | 24 mls |
| Japanese konjac | — | — | 16 | — |
| Chinese taro | — | — | — | 25 |
| Carob gum | — | 16 | — | — |
| "Genulacta L100" | — | 1.5 | 1.5 | 1.5 |
| Water | 6600 | 6600 | 6600 | 6600 |

Procedure

Each mix was blended in a Taylor Rustless Steam Jacketed bowl with a Silverson Lab-bench model L2R. The water (6,600 cc) was raised to 50° C., milk powder added, then sugar, then butter hand-sliced into 5 cm pieces, then GMS. Temperature was raised to 72° C. and held for 10 mins.

The blend was transferred to stainless steel buckets and passed through a homogenizer to reduce fat globules to 1 micron. An APV Gaulin Minor Homogeniser with 2 stage valve at 2000 psi was used.

The homogenized mix was transferred to the Taylor machine and beaten until cool. Vanilla was added and beating/cooling continued to auto-cutout at −5° C. Beating was then continued with manual overide and samples taken to estimate foaming.

Beating was continued until the air content of each mix was approximately 50%.

The ice cream was poured into plastic dishes and frozen in a blast freezer at −25° C.

Results

Some physical properties of the ice cream at various stages of its preparation are shown in Table 3.

TABLE 3

Measurements of Emulsions

| Recipe | Beating Time To 50% Air Content | pH | Viscosity (Brookfield) Spindle 1, 30 rpm | |
|---|---|---|---|---|
| | | | Before Homogn | After Homogn |
| 1 | 4 mins | 6.6 | 4.5 | not measured |
| 2 | 4 mins | 6.5 | 66.5 | 75 |
| 3 | 4 mins | 6.6 | 42 | 64.5 |
| 4 | 4 mins | 6.3 | 78 | greater than 100 |

Subjective examination showed that sample 1 was thinner than samples 2 to 4; that samples 2 and 3 were similar; and that sample 4 was thicker, being thixotropic and containing swollen particles which were not in solution before homogenization.

After cold storage for 3 days, melt-down was assessed by the standard method of standing equal volumes of ice cream on a mesh and allowing it to melt at ambient temperatures:

The results are shown in Table 4.

TABLE 4

Melt-Down Test

| Time | Recipe 1 | Recipe 2 | Recipe 3 | Recipe 4 |
|---|---|---|---|---|
| 10 mins | Just dripping watery | No drip | No drip | Dripping more than 1, but drips are viscous |
| 20 mins | Dripping, watery, little spreading | Just dripping spreading | Just dripping viscous, spreading | Doming |
| 40 mins | 10 ml melt-down | 3 ml melt-down | 12 ml melt-down | 12 ml melt-down |
| 1 hour | 26 ml melt-down; domed | 33 ml melt-down; spread-out | 45 ml melt-down; spread-out | 45 ml melt-down; spread-out |

Subjectively, all the ice creams were acceptable. A taste panel unanimously agreed that recipe sample 1 was watery, with a less full-textured mouth feel. The panel also found that samples 2 to 4 were all better than sample 1 with samples 3 and 4 exhibiting smoother melt-down in the mouth and appearing less crystalline than sample 2.

EXAMPLE 2

Whipping Cream

Carob gum has also been used commercially to stabilize natural whipped cream.

Co-operative Wholesale Society Whipping Cream (48% Butterfat) was used. The thickener was added to the cream and the mix was handwhipped with a kitchen tool to "peaks". ½ pint (276 g) samples were used at room temperature (20° C.).

The results are listed in Table 5.

TABLE 5

Whipped Cream Samples

| Sample No. | Whipping Time To Peaks | Additive | Comment |
|---|---|---|---|
| 1 | 1 minute | Nil | |
| 2 | 1½ minutes | 0.25% Carob | Lighter and more aerated than 1. |
| 3 | 1½ minutes | 0.25% Japanese konjac | Richer than 1 or 2, stiffer than 2. |
| 4 | 1¾ minutes | 0.39% Chinese taro | Very stiff Richer than 1 or 2, Lighter than 1 |

The whipped creams were stored overnight in the refrigerator and tasted at 24 hours age. All tasted similar but sampel 2 had a slight alteration in taste due to the carob gum.

The texture was compared by stirring and piping using domestic cake decorating pipes with the results shown in Table 6.

TABLE 6

Texture of Whipped Creams

| Sample No. | Bulk Cream Texture | Piped Cream Texture |
|---|---|---|
| 1 | Just pourable | Forms stable rosettes |
| 2 | Softer and creamier more foamy, More pourable | Softer foamier |
| 3 | Similar to 1 | Rosettes do not maintain form |
| 4 | Similar to 1 | Form stable rosettes |

EXAMPLE 3

Meringues

Thickeners are used commercially as stabilizers in meringues to improve whipping times and reduce 'bleeding' on cooking.

The following recipe and method was used:

Recipe 2 egg whites (separated from hen eggs: approx. 58 g)
4 oz. caster sugar (113 g)
Pinch of salt (NaCl)

Method

The egg whites were hand-whipped until peaked. Two teaspoons of caster sugar were beaten in and the remainder of the sugar was folded in. The mix was piped onto grease proof paper. Cooking time was 1½ hours in a forced air oven at 129° C.

After cooking, the meringue shells were left to stabilize and samples were evaluated after 24 hours.

TABLE 7

Meringue Samples

| Sample No. | Recipe | Whipping Texture | Eating Texture |
|---|---|---|---|
| 1 | Standard | Good foam | Sweet and crisp |
| 2 | Plus 0.25% carob | Better foam | Sweet and crisp |
| 3 | Plus 0.25% Japanese | than 1, less let-down | Sweet and crisp |

TABLE 7-continued

| Sample No. | Recipe | Meringue Samples | |
|---|---|---|---|
| | | Whipping Texture | Eating Texture |
| 4 | konjac Plus 0.39% Chinese taro | with sugar addition | Sweet and crisp |

EXAMPLE 4

Cheese Spreads

Traditionally cheeses are blended into a spreadable form by cooking while beating with the addition of emulsifying salts that complex the calcium, casein, and fats at a buffered pH. The salts are called Joha Emulsifying agents. They consist of sodium, potassium and calcium polyphosphates, disphosphates, monophosphates and citrates.

Red Leicester cheese was formed into a cheese spread using the recipe and method shown in Table 8.

TABLE 8

Cheese Spread Recipe and Method

| | Basic Recipe % | Sample No. | | | |
|---|---|---|---|---|---|
| | | 1 (g) | 2 (g) | 3 (g) | 4 (g) |
| Red Leicester Cheese | 60 | 300 | 300 | 300 | 300 |
| Water | 34.5 | 173 | 173 | 173 | 173 |
| Joha S9 | 3 | 15 | 15 | 15 | 15 |
| Carob gum | (0.5) | — | 2½ | — | — |
| Japanese konjac | (0.5) | — | — | 2½ | — |
| Chinese taro | (0.6) | — | — | — | 3 |

The mix was blended 5 minutes at 85° C. in a steam jacketed Hobart bowl and scraped into polyfoil dishes.

After 24 hours the samples were tested for texture and taste and the results are listed in Table 9.

TABLE 9

Cheese Spreads

| Sample No. | Texture | Taste |
|---|---|---|
| 1 | Soft | Pleasant cheesey taste |
| 2 | Slightly stiffer | Pleasant cheesey taste but fruity carob aftertaste |
| 3 | Stiffer than 2, slightly waxy | Pleasant cheesey taste No aftertaste |
| 4 | Stiffer than 3, more crumbly | Pleasant cheesey taste No aftertaste |

EXAMPLE 5

Cheese Slices

Similar techniques to those of Example 4 are used to produce a stiffer cheese for slicing. The addition of thickeners reduces melt-down effects when such processed cheese slices are subsequently used in cooking, for example Welsh Rarebit.

The cheeses from Example 4 were reheated with beating to lower the moisture content and left to stiffen overnight in the refrigerator.

Next day, slices were cut with an electric knife and equal weights placed on toast. All four samples were toasted simultaneously under a domestic gas oven grill. Sample 1 (no gum) melted quicker and ran over the sides of the bread. Samples 2, 3 and 4 all showed less tendency to overflow when molten.

All four samples tasted equally pleasant.

EXAMPLE 6

Milk Drinks

Japanese konjac and Chinese taro were added to a commercially available milk drink and left overnight in the refrigerator. The mix was then homogenized with the Silverson mixer (highest shear). Viscosities were measured with the Brookfield Viscometer (Model LVT).

The results are listed in Table 10.

TABLE 10

Thickened Milk Drinks

| Sample No. | Addition | Viscosity (Scale Reading) Spindle 2/30 rpm | Subjective Assessment |
|---|---|---|---|
| 1 | 0.33% Japanese konjac | 10 | Foamy, thick texture, very pleasant |
| 2 | 0.66% Chinese taro | 40 | Foamy, slightly thicker texture, very pleasant |
| 3 | Nil | 3 | Thin, milky texture |

What is claimed is:

1. An ungelled processed food product containing from 0.01 to 5 percent, by weight of said food product, of a thickening and/or stabilizing agent consisting essentially of at least one glucomannan, said food product being an emulsion of air or oil and having a pH not higher than 8.

2. An ungelled processed food product emulsion as in claim 1 which is a dairy product.

3. An ungelled processed food product emulsion as in claim 2 which is ice cream, whipping cream, a cheese spread, cheese slices, a flavored milk drink, or meringue.

4. An ungelled processed food product emulsion as in claim 1 which is a salad cream or mayonnaise.

5. An ungelled processed food product as in claim 1 wherein said glucomannan is derived from an Amorphophallus species.

6. An ungelled processed food product as in claim 5 wherein said glucomannan is derived from *A. konjac, A. oncophyllus, A. variabilis, A. bulbifera,* or *A. blumeii.*

7. An ungelled processed food product emulsion as in claim 1 wherein said glucomannan is derived from an Amorphophallus species.

8. An ungelled processed food product emulsion as in claim 7 wherein said glucomannan is derived from *A. konjac, A. oncophyllus, A. variabilis, A. bulbifera,* or *A. blumeii.*

* * * * *